United States Patent
Lee et al.

(10) Patent No.: US 9,449,763 B2
(45) Date of Patent: Sep. 20, 2016

(54) MULTILAYER CERAMIC ELECTRONIC COMPONENT HAVING ALTERNATIVELY OFFSET INTERNAL ELECTRODES AND METHOD OF MANUFACTURING THE SAME

(71) Applicant: SAMSUNG ELECTRO-MECHANICS CO., LTD., Suwon, Gyunggi-do (KR)

(72) Inventors: Jong Ho Lee, Gyunggi-do (KR); Jae Yeol Choi, Gyunggi-do (KR); Sung Woo Kim, Gyunggi-do (KR); Yu Na Kim, Gyunggi-do (KR)

(73) Assignee: SAMSUNG ELECTRO-MECHANICS CO., LTD., Suwon-Si, Gyeonggi-Do (KR)

( * ) Notice: Subject to any disclaimer, the term of this patent is extended or adjusted under 35 U.S.C. 154(b) by 239 days.

(21) Appl. No.: 13/965,697

(22) Filed: Aug. 13, 2013

(65) Prior Publication Data
US 2014/0362492 A1    Dec. 11, 2014

(30) Foreign Application Priority Data

Jun. 5, 2013 (KR) .......... 10-2013-0064484

(51) Int. Cl.
| H01G 4/30 | (2006.01) |
| H01G 4/012 | (2006.01) |
| H01G 4/232 | (2006.01) |
| H01G 4/12 | (2006.01) |
| H01G 13/00 | (2013.01) |

(52) U.S. Cl.
CPC .............. *H01G 4/30* (2013.01); *H01G 4/012* (2013.01); *H01G 4/232* (2013.01); *H01G 13/00* (2013.01); *H01G 4/12* (2013.01); *Y10T 29/435* (2015.01)

(58) Field of Classification Search
CPC ........ H01G 4/30; H01G 4/012; H01G 4/232; H01G 4/12
See application file for complete search history.

(56) References Cited

U.S. PATENT DOCUMENTS

| 6,965,167 B2 * | 11/2005 | Liu .............................. 257/777 |
| 2006/0139848 A1 | 6/2006 | Kim et al. |
| 2012/0293908 A1 * | 11/2012 | Koga et al. ................ 361/301.4 |
| 2013/0107417 A1 | 5/2013 | Cho et al. |
| 2013/0208398 A1 * | 8/2013 | Tanaka et al. ............. 361/301.4 |

FOREIGN PATENT DOCUMENTS

| JP | 04171708 A | * | 6/1992 |
| JP | 11340083 A | * | 12/1999 |

(Continued)

OTHER PUBLICATIONS

Korean Office Action issued in Korean Application No. 10-2013-0064484 dated May 23, 2014, w/English translation.

*Primary Examiner* — David M Sinclair
(74) *Attorney, Agent, or Firm* — McDermott Will & Emery LLP

(57) ABSTRACT

There is provided a multilayer ceramic electronic component, including: a ceramic body in which a plurality of dielectric layers are stacked; a plurality of first and second internal electrodes alternately exposed through both end surfaces of the ceramic body, having respective ones of the dielectric layers interposed therebetween, and being placed alternately to the left and to the right in a width direction of the ceramic body to be offset from one another, when the ceramic body is viewed in a width-thickness cross-sectional direction; and first and second external electrodes formed on the end surfaces of the ceramic body and electrically connected to the first and second internal electrodes, respectively.

10 Claims, 4 Drawing Sheets

FOREIGN PATENT DOCUMENTS

| | | |
|---|---|---|
| JP | 2002-184648 A | 6/2002 |
| JP | 2004022859 A * | 1/2004 |
| JP | 2006-179893 A | 7/2006 |
| JP | 2010093136 A * | 4/2010 |
| KR | 2013-0047886 A | 5/2013 |

* cited by examiner

A-A'

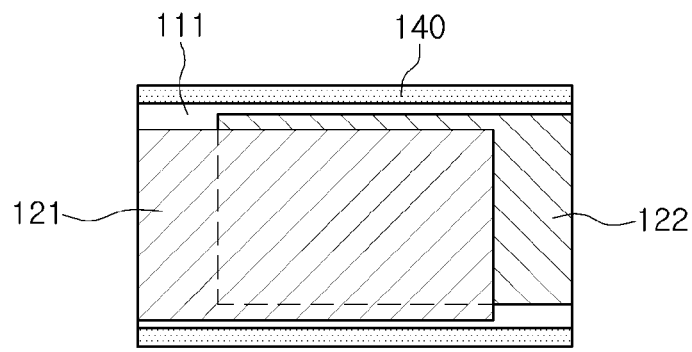
FIG. 5
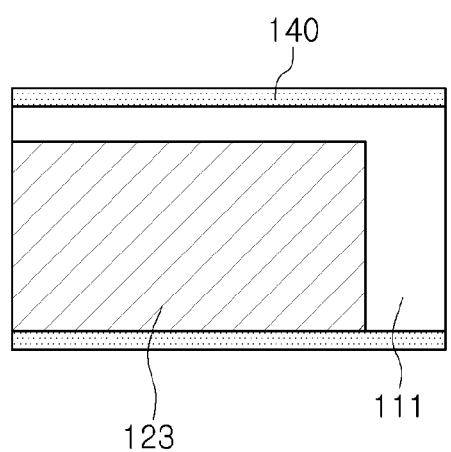 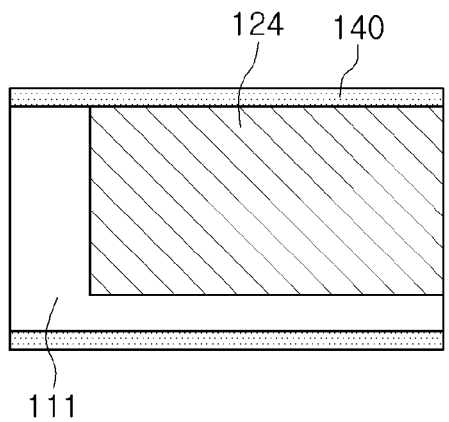
FIG. 6A    FIG. 6B

MULTILAYER CERAMIC ELECTRONIC COMPONENT HAVING ALTERNATIVELY OFFSET INTERNAL ELECTRODES AND METHOD OF MANUFACTURING THE SAME

CROSS-REFERENCE TO RELATED APPLICATION

This application claims the priority of Korean Patent Application No. 10-2013-0064484 filed on Jun. 5, 2013, in the Korean Intellectual Property Office, the disclosure of which is incorporated herein by reference.

BACKGROUND OF THE INVENTION

1. Field of the Invention

The present invention relates to a multilayer ceramic electronic component and a method of manufacturing the same.

2. Description of the Related Art

In general, electronic components using a ceramic material include capacitors, inductors, piezoelectric elements, varistors, thermistors, and the like.

Among ceramic electronic components, a multilayer ceramic capacitor (MLCC) is an electronic component having advantages such as compactness, high capacitance, and ease of mounting.

Such a multilayer ceramic capacitor is a chip-type capacitor that is mounted on circuit boards of various electronic products such as display devices, such as liquid crystal displays (LCDs), plasma display panels (PDPs), and the like, computers, personal digital assistants (PDAs), mobile phones, and the like, and serves to charge electricity or discharge electricity.

A multilayer ceramic capacitor may include a plurality of dielectric layers stacked on one another, internal electrodes disposed to face one another, having the dielectric layer interposed therebetween, and external electrodes electrically connected to the internal electrodes.

Recently, as electronic products have been continually reduced in size, multilayer ceramic electronic components have also been required to be reduced in size while having higher degrees of capacitance. In accordance with this, multilayer ceramic electronic components have recently been manufactured to have thinner dielectric layers provided in greater numbers as compared with the related art electronic components.

As the dielectric layers are thinned and the number thereof is increased, however, in a ceramic body, density differences between an active region in which internal electrodes are formed and a margin portion in which no internal electrodes are formed are increased.

Such differences in density are more significant in the width direction of the product than in the length direction thereof, and in stacking and pressing processes in the manufacturing of the multilayer ceramic electronic component, interlayer-collapse may occur, such that interlayer-delamination or cracks may occur in the margin portion, and thus moisture, plating solution and foreign objects may be introduced into the product. Therefore, product reliability may be lowered.

In addition, since voltage per thickness becomes higher as the dielectric layers are thinned, there is high possibility that insulation of the dielectric layers will be broken even when a lower voltage is applied to a multilayer ceramic electronic component.

In particular, on a cross-section of the multilayer ceramic capacitor in the width-thickness direction thereof, two edges of internal electrodes in the width direction thereof are elongated during the pressing process so that they have a wedge shape, and thus the intensity of the electric field may be increased due to a notch effect.

Accordingly, high intensity electric fields are overlapped at the adjacent edges of the internal electrodes in the stacking direction, and thus, insulation of dielectric layers may be more easily broken.

Patent Document 1 relates to a multilayer ceramic capacitor, but does not disclose the following structure: first and second internal electrodes are alternately disposed to the left and to the right in the width direction so that they are offset from one another.

RELATED ART DOCUMENT (Patent Document 1) Japanese Patent Laid-open Publication No. 2002-184648

SUMMARY OF THE INVENTION

An aspect of the present invention provides a multilayer ceramic electronic component having a relatively small size with a high degree of capacitance implemented therein, while achieving improved reliability by preventing interlayer-delamination or cracks occurring in a margin portion due to interlayer-collapses during stacking and pressing processes, and preventing an insulation breakdown under conditions of high voltage, by reducing a difference in density between an active region and the margin portion in a width direction thereof.

According to an aspect of the present invention, there is provided a multilayer ceramic electronic component, including: a ceramic body in which a plurality of dielectric layers are stacked; a plurality of first and second internal electrodes alternately exposed through both end surfaces of the ceramic body, having respective ones of the dielectric layers interposed therebetween, and being placed alternately to the left and to the right in a width direction of the ceramic body to be offset from one another, when the ceramic body is viewed in a width-thickness cross-sectional direction; and first and second external electrodes formed on the end surfaces of the ceramic body and electrically connected to the first and second internal electrodes, respectively.

When a width of an offset portion of the first and second internal electrodes is defined as a and the width a plus a margin portion on either side of the ceramic body in the width direction thereof is defined as b, $0.1 \leq a/b$ may be satisfied.

The multilayer ceramic electronic component may further include an insulating layer formed on the side surfaces of the ceramic body.

When a width of the insulating layer is defined as c, $5 \, \mu m \leq c \leq 50 \, \mu m$ may be satisfied.

When a width of an offset portion of the first and second internal electrodes is defined as a, the width a plus a margin portion on either side of the ceramic body in the width direction thereof is defined as b, and a width of the insulating layer is defined as c, $0.1 \leq a/b$ and $5 \, \mu m \leq c \leq 50 \, \mu m$ may be satisfied.

The first and second internal electrodes may be spaced apart from the side surfaces of the ceramic body.

The first and second internal electrodes may be exposed through the side surfaces of the ceramic body.

The first and second internal electrodes may be spaced apart from the side surfaces of the ceramic body, and have respective space portions formed in non-overlapped corners of one ends thereof within the ceramic body, the space portions diagonally opposing one another.

According to another aspect of the present invention, there is provided a method of manufacturing a multilayer ceramic electronic component, including: preparing a multilayer body by stacking and pressing a plurality of ceramic green sheets having respective ones of first and second internal electrodes formed thereon such that the first and second internal electrodes are alternately stacked with one of the ceramic green sheets interposed therebetween and are arranged to be offset from one another to the left and to the right in a width direction; preparing a ceramic body by cutting the multilayer body into portions corresponding to respective chips while allowing the first and second internal electrodes to be alternately exposed through both end surfaces thereof; and forming first and second external electrodes on the end surfaces of the ceramic body so as to be electrically connected to the first and second internal electrodes, respectively.

BRIEF DESCRIPTION OF THE DRAWINGS

The above and other aspects, features and other advantages of the present invention will be more clearly understood from the following detailed description taken in conjunction with the accompanying drawings, in which:

FIG. 5 is a plan view of the first and second internal electrodes of FIGS. 4A and 4B overlapping one another;

FIGS. 6A and 6B are plan views of first and second internal electrodes of a multilayer ceramic capacitor according to another embodiment of the present invention;

DETAILED DESCRIPTION OF THE EMBODIMENTS

Figure 1:
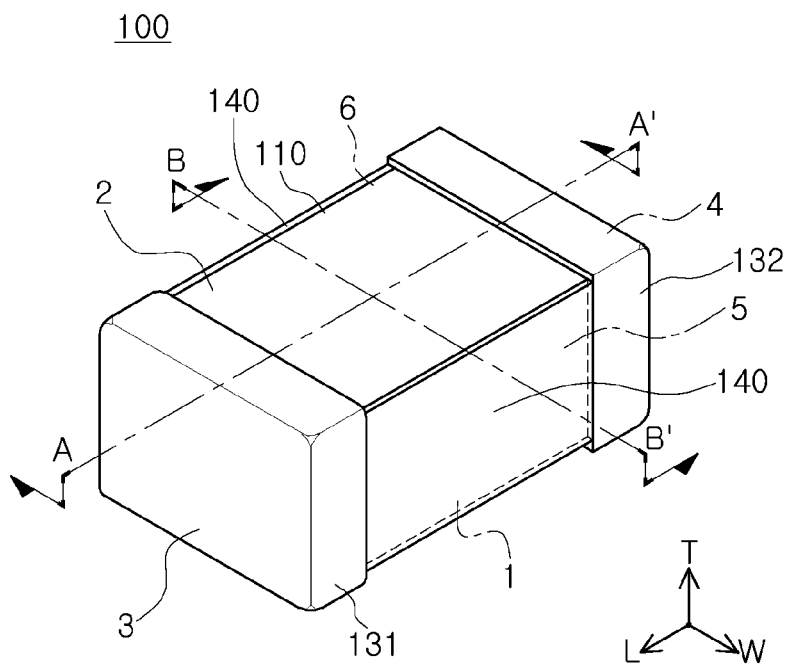
FIG. 1 is a schematic perspective view of a multilayer ceramic capacitor according to an embodiment of the present invention.

Hereinafter, embodiments of the present invention will be described in detail with reference to the accompanying drawings.

The invention may, however, be embodied in many different forms and should not be construed as being limited to the embodiments set forth herein. Rather, these embodiments are provided so that this disclosure will be thorough and complete, and will fully convey the scope of the invention to those skilled in the art.

In the drawings, the shapes and dimensions of elements may be exaggerated for clarity, and the same reference numerals will be used throughout to designate the same or like elements.

Hereinafter, a multilayer ceramic electronic component according to an embodiment of the present invention will be described. Particularly, a multilayer ceramic capacitor will be described. However, the invention is not limited thereto.

Multilayer Ceramic Capacitor

Figure 2:
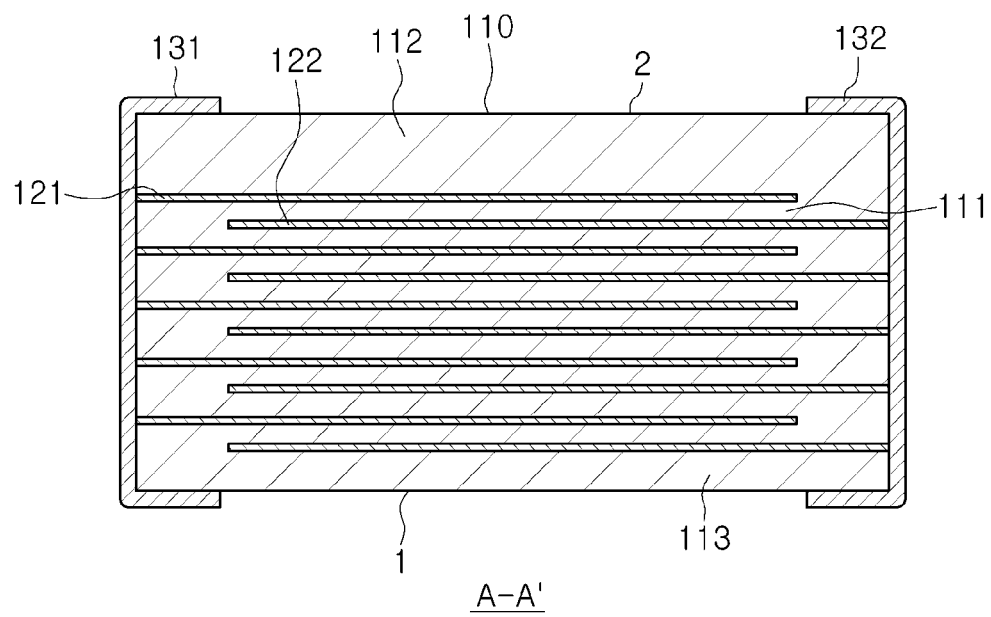
FIG. 2 is a cross-sectional view taken along line A-A' of FIG. 1.

FIG. 1 is a schematic perspective view of a multilayer ceramic capacitor according to an embodiment of the invention; and FIG. 2 is a cross-sectional view taken along line A-A' of FIG. 1.

Referring to FIGS. 1 and 2, a multilayer ceramic capacitor 100 according to an embodiment of the invention includes a ceramic body 110 in which a plurality of dielectric layers 111 are stacked, a plurality of first and second internal electrodes 121 and 122, and first and second external electrodes 131 and 132.

The ceramic body 110 is formed by stacking the plurality of dielectric layers 111 in a thickness direction and then sintering the same. The shape and dimensions of the ceramic body 110 and the number of the dielectric layers 111 are not limited to the present embodiment.

The plurality of dielectric layers 111 forming the ceramic body 110 may be integrated in a sintered state such that boundaries therebetween may not be clearly discernible without the use of a scanning electron microscope (SEM).

The shape of the ceramic body 110 is not particularly limited, but may be hexahedral, for example.

For convenience of explanation, in this embodiment, surfaces of the ceramic body 110 opposing one another in a thickness direction are referred to as first and second main surfaces 1 and 2, respectively; surfaces of the ceramic body 110 opposing one another in a length direction and connecting the first and second main surfaces 1 and 2 are referred to as first and second end surfaces 3 and 4, respectively; and surfaces of the ceramic body 110 opposing in a width direction and perpendicular to the end surfaces are referred to as first and second side surfaces 5 and 6, respectively.

Further, in order to clearly describe the embodiments of the invention, directions of the ceramic body 110, i.e., L, W and T shown in FIG. 1 are referred to as a length direction, a width direction, and a thickness direction, respectively.

Here, the thickness direction may refer to a stacking direction in which the dielectric layers 111 are stacked.

The dielectric layers 111 may include a ceramic powder having high permittivity, e.g., a barium titanate ($BaTiO_3$)-based powder or a strontium titanate ($SrTiO_3$)-based powder. However, the invention is not limited thereto, but other powder may be used as long as sufficient capacitance can be obtained.

In addition to the ceramic powder, various types of ceramic additives such as a transition metal oxide or carbide, a rear-earth element, magnesium (Mg) or aluminum (Al), organic solvents, plasticizers, binders, dispersing agents, and the like may be added to the dielectric layers 111, as necessary.

An average thickness of the dielectric layers 111 may be changed depending on the designed capacitance of the multilayer ceramic capacitor 100.

The ceramic body 110 may include an active region contributing to the formation of capacitance of the capacitor and including the dielectric layers 111 and the first and second internal electrodes 121 and 122, and upper and lower cover layers 112 and 113 respectively formed above and below the active region as upper and lower margin portions.

The upper and lower cover layers 112 and 113 may have the same material and composition as those of the dielectric layers 111 in the active region, except that the upper and lower cover layers 112 and 113 do not include internal electrodes therein, and may be formed by stacking a single dielectric layer or two or more dielectric layers on upper and lower surfaces of the active region in the thickness direction, respectively.

Basically, the upper and lower cover layers 112 and 113 may prevent damages to the first and second internal electrodes 121 and 122 caused by physical or chemical stress.

The first and second internal electrodes 121 and 122 have opposite polarities, and may be formed by printing a conductive paste containing a conductive metal on the dielectric layers 111 at a predetermined thickness.

Here, the first and second internal electrodes 121 and 122 are alternately exposed to both end surfaces of the ceramic body 110 in the stacking direction of the dielectric layers 111 having one of the dielectric layers 111 interposed between the first and second internal electrodes, and the first and second internal electrodes 121 and 122 are electrically insulated from one another by the interposed dielectric layer.

The first and second internal electrodes 121 and 122 are electrically connected to the first and second external electrodes 131 and 132, respectively, through the portions thereof alternately exposed to the end surfaces of the ceramic body 110.

Accordingly, when voltage is applied to the first and second external electrodes 131 and 132, charges are stored between the first and second internal electrodes 121 and 122 facing one another, and the capacitance of the multilayer ceramic capacitor 100 is proportional to an overlapping area between the first and second internal electrodes 121 and 122 in the active region.

The thicknesses of the first and second internal electrodes 121 and 122 may be changed depending on the designed capacitance of the multilayer ceramic capacitor 100.

The conductive metal contained in the conductive paste forming the first and second internal electrodes 121 and 122 may be one of, but is not limited to, silver (Ag), palladium (Pd), platinum (Pt), nickel (Ni), copper (Cu) or an alloy thereof.

The printing of the conductive paste may include, but is not limited to, screen printing or gravure printing.

Figure 3:
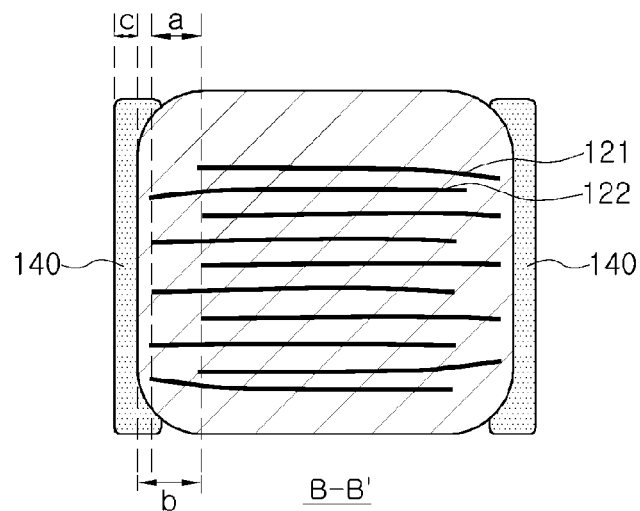
FIG. 3 is a cross-sectional view taken along line B-B' of FIG. 1.
Figure 4A:
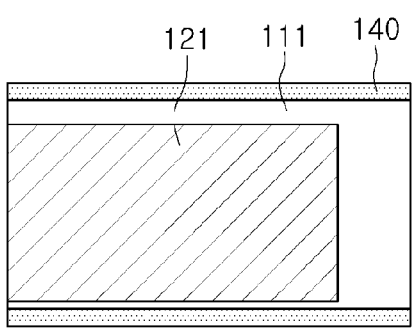
FIGS. 4A and 4B are plan views of first and second internal electrodes of the multilayer ceramic capacitor according to the embodiment of the present invention.
Figure 4B:
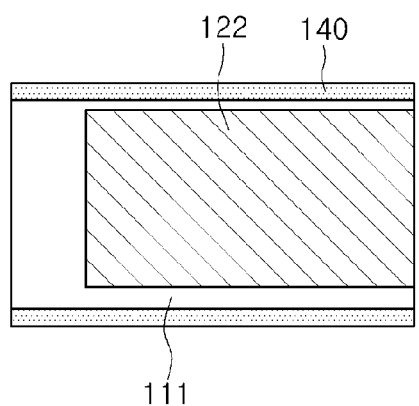

FIG. 3 is a cross-sectional view taken along line B-B' of FIG. 1; FIGS. 4A and 4B are plan views of first and second internal electrodes of the multilayer ceramic capacitor according to the embodiment of the invention; and FIG. 5 is a plan view of the first and second internal electrodes of FIGS. 4A and 4B overlapping one another.

Referring to FIGS. 3 to 5, in order to reduce a difference in density between the active region in which the internal electrodes are formed and the margin portion in which no internal electrode is formed, the first and second internal electrodes 121 and 122 are alternately placed to the left and to the right in the width direction so that they are offset from one another, when the ceramic body 110 is viewed in a width-thickness cross-sectional direction.

Therefore, step difference portions between the active region and the margin portion in the width direction of the ceramic body 110 are not overlapped, such that interlayer-delamination or cracks in the margin portion may be prevented. Thus, degradations in reliability in terms of high-temperature acceleration and moisture resistance load may be prevented, and breakdown voltage (BDV) characteristics may be increased to avoid insulation breakdown.

Here, when a width of an offset portion of the first and second internal electrodes 121 and 122 is defined as "a," and the width a plus a margin portion on either side of the ceramic body in the width direction thereof is defined as "b," $0.1 \leq a/b$ may be satisfied.

If a/b is below 0.1, the improved step difference may not contribute to an improvement in moisture resistance properties.

The first and second internal electrodes 121 and 122 may be spaced apart from both side surfaces of the ceramic body 110 by a predetermined width in order to obtain a margin portion in the width direction of the ceramic body 110.

Further, in order to compensate for a reduction in the margin portions in the width direction, reduced due to the offset arrangement of the internal electrodes, insulating layers 140 may be formed on both side surfaces of the ceramic body 110.

The insulating layers 140 may be made of ceramic slurry or an insulating polymer material, but the material thereof is not limited thereto.

In addition, when a width of the insulating layer 140 is defined as "c," $5 \ \mu m \leq c \leq 50 \ \mu m$ may be satisfied.

Here, if the width c of the insulating layer 140 is below 5 μm, moisture resistance properties may be degraded. If the width c of the insulating layer 140 is above 50 μm, the overlapping area of the first and second internal electrodes 121 and 122 is relatively reduced within a predetermined chip size, so that capacitance may be reduced.

The first and second external electrodes 131 and 132 may be formed on both end surfaces of the ceramic body 110 so as to be in contact with and electrically connected to the exposed portions of the first and second internal electrodes 121 and 122, respectively.

The first and second external electrodes 131 and 132 may be made of a conductive paste containing a conductive metal, and the conductive metal may be silver (Ag), nickel (Ni), copper (Cu) or an alloy thereof, but the material for the external electrodes is not limited thereto.

If necessary, a plating layer (not shown) may be formed on the first and second external electrodes 131 and 132.

The plating layer may be provided to enhance adhesive strength when the multilayer ceramic capacitor 100 is mounted on a printed circuit board by soldering.

The plating layer may include, for example, a nickel (Ni) plating layer formed on each of the first and second external electrodes 131 and 132, and a tin (Sn) plating layer formed on the nickel plating layer. However, the invention is not limited thereto.

Method of Manufacturing Multilayer Ceramic Capacitor

Hereinafter, a method of manufacturing a multilayer ceramic capacitor according to an embodiment of the invention will be described.

Initially, a plurality of green sheets may be prepared.

The green sheets, ceramic green sheets may be fabricated to have a thickness of several μm in such a manner that slurry prepared by mixing a ceramic powder with a ceramic additive, a solvent, a plasticizer, a binder, a dispersant, and the like, using a basket mill, may be applied to a carrier film and dried. The green sheets are used for forming the dielectric layers 111 of the ceramic body 110.

Subsequently, internal electrode layers may be formed using a conductive paste while the conductive paste is dispensed onto the green sheets and a squeegee spreads the conductive paste in one direction. The internal electrode layers are used for forming the first and second internal electrodes 121 and 122.

The conductive paste may include a metal powder, a ceramic powder, a silica ($SiO_2$) powder, and the like.

In addition, the metal powder may include one of silver (Ag), palladium (Pd), platinum (Pt), nickel (Ni) and copper (Cu), or an alloy thereof.

The internal electrode layers may be formed by printing the conductive paste on the green sheets using a screen printing method, a gravure printing method or the like.

Subsequently, after the ceramic green sheets having the internal electrode layers formed thereon are separated from the carrier film, the ceramic green sheets may be stacked to allow the internal electrode layers to be alternately placed to the left and to the right in the width direction to be offset from one another, and may be pressed under conditions of high pressure and high temperature, to obtain a multilayer body.

Then, the multilayer body may be cut into portions corresponding to respective chips while allowing the internal electrode layers to be alternately exposed through both end surfaces thereof, and the cut chip may be sintered and polished to obtain the ceramic body 110 including the first and second internal electrodes 121 and 122 alternately exposed through the end surfaces thereof.

Then, the first and second external electrodes 131 and 132 may be formed on the end surfaces of the ceramic body 110 so as to be in contact with and electrically connected to the exposed portions of the first and second internal electrodes 121 and 122, respectively.

If necessary, plating layers may also be formed on the first and second external electrodes 131 and 132.

EXAMPLES

Multilayer ceramic capacitors according to Inventive and Comparative Examples are manufactured as follows. However, the invention is not limited thereto.

After first and second internal electrodes were formed on ceramic green sheets using a conductive paste for internal electrodes by a screen printing method, the ceramic green sheets were stacked in an amount of 200 to 270 layers while allowing the first and second internal electrodes to be alternately offset from one another to the left and to the right in the width direction, with the ceramic green sheet interposed between the first and second electrodes, thereby preparing a multilayer body.

Then, the multilayer body was pressed and cut into individual chips having a 1005 standard size, and each chip was sintered under a reducing atmosphere ($H_2$ of 0.1%) at a temperature between 1050° C. and 1200° C., to prepare a ceramic body.

Then, the ceramic body was subjected to processes of forming external electrodes, plating layers and the like, to produce a multilayer ceramic capacitor.

Table 1 below shows accelerated life test results depending on values of a/b, wherein a width of an offset portion of the first and second internal electrodes is defined as "a," and the width a plus a margin portion on either side of the ceramic body in the width direction thereof is defined as "b." Each of the samples was manufactured to have different values of a and b.

Here, Comparative Examples were manufactured to satisfy a/b≤1.0.

The accelerated life test was conducted under conditions of 12.6 V DC voltage and 105° C., and if the insulation resistance of a sample fell to $10^4 \Omega$ or less within three hours, the sample was evaluated as "NG," if not, the sample was evaluated as "OK."

TABLE 1

| # | a [μm] | b [μm] | a/b | Accelerated Life Test Results |
|---|---|---|---|---|
| Comparative Example 1 | 1 | 33 | 0.03 | NG |
| Comparative Example 2 | 3 | 42 | 0.07 | NG |
| Comparative Example 3 | 3 | 37 | 0.08 | NG |
| Inventive Example 1 | 4 | 33 | 0.12 | OK |
| Inventive Example 2 | 4 | 39 | 0.10 | OK |
| Inventive Example 3 | 5 | 43 | 0.11 | OK |
| Inventive Example 4 | 5 | 45 | 0.11 | OK |
| Inventive Example 5 | 5 | 40 | 0.13 | OK |
| Inventive Example 6 | 5 | 42 | 0.12 | OK |
| Inventive Example 7 | 10 | 44 | 0.23 | OK |
| Inventive Example 8 | 12 | 35 | 0.34 | OK |
| Inventive Example 9 | 17 | 45 | 0.38 | OK |
| Inventive Example 10 | 22 | 39 | 0.56 | OK |
| Inventive Example 11 | 22 | 36 | 0.61 | OK |
| Inventive Example 12 | 28 | 45 | 0.62 | OK |
| Inventive Example 13 | 32 | 44 | 0.73 | OK |
| Inventive Example 14 | 37 | 47 | 0.79 | OK |
| Inventive Example 15 | 41 | 51 | 0.80 | OK |

As can be seen from Table 1, in Inventive Examples 1 to 15, the values of a/b fell within a range of the present inventive concept, and as a result of the accelerated life test, no sample had insulation resistance of $10^4 \Omega$ or less within three hours.

In contrast, in Comparative Examples 1 to 3, the values of a/b were below 0.1, and, defective samples were evident in the accelerated life test results.

Table 2 below shows moisture resistance test results depending on values of c, wherein a width of an offset portion of the first and second internal electrodes is defined as "a," the width a plus a margin portion on either side of the ceramic body in the width direction thereof is defined as "b," and a width of an insulating layer is defined as "c," and the values of a/b fell within the range of the present inventive concept. Each of the samples was manufactured to have different values of a, b and c.

Here, Comparative Examples were manufactured to have the values of c below 5 μm or above 50 μm.

The moisture resistance test was conducted under conditions of 6.3 V DC voltage, 85° C. and relative humidity of 85%, and if the insulation resistance of a sample fell to $10^4 \Omega$ or less within one hour, the sample was evaluated as "NG," and if not, the sample was evaluated as "OK."

In addition, capacitance was measured after performing a heat treatment at 150° C. for an hour and keeping the samples at room temperature for 1000 hours. If a capacitance level between 80% and 120% of a standard value was implemented in a sample, the sample was evaluated as "OK," and if not, the sample was evaluated as "NG."

TABLE 2

| # | a [μm] | b [μm] | a/b | c [μm] | Moisture Resistance Test Results | Capacitance Evaluation |
|---|---|---|---|---|---|---|
| Comparative Example 1 | 34 | 35 | 0.97 | 2 | NG | OK |
| Comparative Example 2 | 33 | 34 | 0.97 | 3 | NG | OK |
| Comparative Example 3 | 34 | 45 | 0.76 | 4 | NG | OK |
| Inventive Example 1 | 22 | 34 | 0.65 | 5 | OK | OK |
| Inventive Example 2 | 33 | 34 | 0.97 | 7 | OK | OK |
| Inventive Example 3 | 25 | 33 | 0.76 | 11 | OK | OK |
| Inventive Example 4 | 33 | 34 | 0.97 | 18 | OK | OK |
| Inventive Example 5 | 25 | 44 | 0.57 | 23 | OK | OK |
| Inventive Example 6 | 35 | 42 | 0.83 | 31 | OK | OK |
| Inventive Example 7 | 9 | 34 | 0.26 | 38 | OK | OK |
| Inventive Example 8 | 10 | 36 | 0.28 | 45 | OK | OK |
| Inventive Example 9 | 11 | 43 | 0.26 | 50 | OK | OK |
| Comparative Example 4 | 5 | 45 | 0.11 | 53 | OK | NG |
| Comparative Example 5 | 27 | 44 | 0.61 | 60 | OK | NG |
| Comparative Example 6 | 33 | 34 | 0.97 | 70 | OK | NG |

As can be seen from Table 2 above, in Inventive Examples 1 to 9, the values of a/b and the values of c fell within the range of the present inventive concept, no defective sample was evident in the moisture resistance test results, and the capacitance evaluation results were also satisfactory.

That is, if the values of c satisfy the range of the present inventive concept, highly reliable multilayer ceramic electronic components having high capacitance and showing no deterioration in the moisture resistance test may be implemented.

In contrast, in Comparative Examples 1 to 3, the values of c were below 5 μm, and defective samples were evident in the moisture resistance test results since margin portions were insufficient.

Further, in Comparative Examples 4 to 6, the values of c were above 50 μm, and although no defective sample was evident in the moisture resistance test results, capacitance between 80% and 120% of the standard value was not implemented.

In conclusion, by adjusting the width of the insulating layer formed on the side surfaces of the ceramic body to be between 5 μm and 50 μm, a multilayer ceramic electronic component having high reliability and large capacitance may be realized.

Modified Examples

Figure 7:
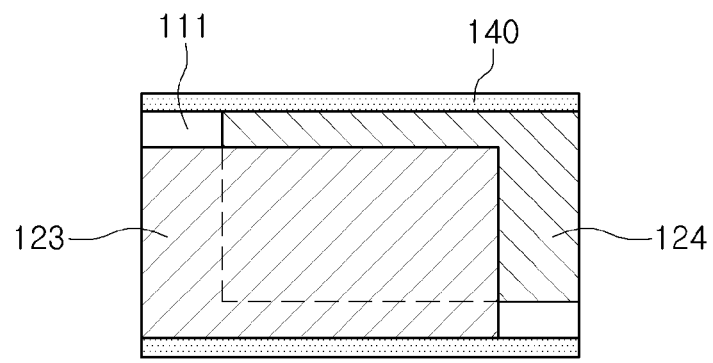
FIG. 7 is a plan view of the first and second internal electrodes of FIGS. 6A and 6B overlapping one another.

FIGS. 6A and 6B are plan views showing first and second internal electrodes of a multilayer ceramic capacitor according to another embodiment of the invention; and FIG. 7 is a plan view of the first and second internal electrodes of FIGS. 6A and 6B overlapping one another.

The configuration of the first and second external electrodes 131 and 132 and the insulating layer 140 in the present embodiment is the same as that described in the above-described embodiment, and thus a detailed description thereof will be omitted, and first and second internal electrodes 123 and 124 having a different configuration therefrom will be described in detail.

Referring to FIGS. 6 and 7, in the multilayer ceramic capacitor 100 according to this embodiment, the first internal electrode 123 may be exposed to the first end surface 3 and the first side surface 5 of the ceramic body 110, and the second internal electrode 124 may be exposed to the second end surface 4 and the second side surface 6 of the ceramic body 110.

Since the first and second internal electrodes 123 and 124 are exposed to the first and second side surfaces 5 and 6 of the ceramic body 110, respectively, step differences in the ceramic body 110 in the width direction thereof may be further reduced as compared to the above-described embodiment. Here, margin portions of the ceramic body 110 may be ensured by the insulating layers 140 having a predetermined width.

Figure 8A:
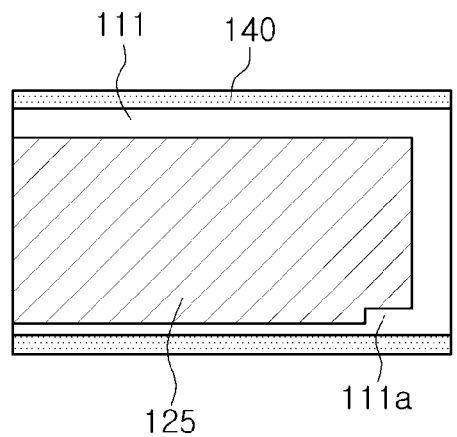
FIGS. 8A and 8B are plan views of first and second internal electrodes of a multilayer ceramic capacitor according to another embodiment of the present invention.
Figure 8B:
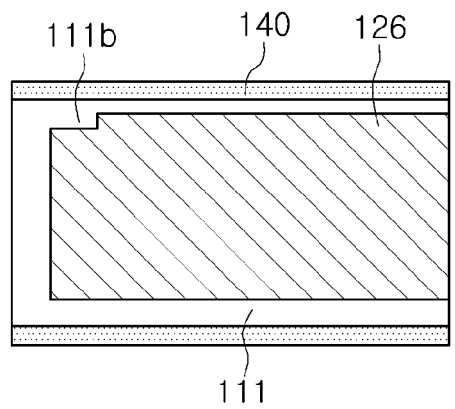
Figure 9:
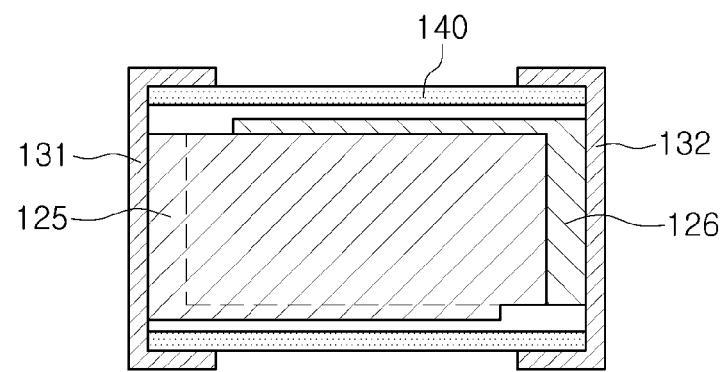
FIG. 9 is a plan view of the first and second internal electrodes of FIGS. 8A and 8B overlapping one another.

FIGS. 8A and 8B are plan views showing first and second internal electrodes of a multilayer ceramic capacitor according to another embodiment of the invention; and FIG. 9 is a plan view of the first and second internal electrodes of FIGS. 8A and 8B overlapping one another.

The configuration of the first and second external electrodes 131 and 132 and the insulating layer 140 in the present embodiment is the same as that described in the above-described embodiment, and thus a detailed description thereof will be omitted, and first and second internal electrodes 125 and 126 having a different configuration therefrom will be described in detail.

Referring to FIGS. 8 and 9, in the multilayer ceramic capacitor 100 according to this embodiment, the first internal electrode 125 may have a first space portion 111a formed in a corner of one end thereof within the ceramic body 110 which is not overlapped with the second internal electrode 126, and the second internal electrode 126 may have a second space portion 111b formed in a corner of one end thereof within the ceramic body 110 which is not overlapped with the first internal electrode 125, the first and second space portions diagonally opposing one another.

Therefore, an additional distance between the first and second internal electrodes 125 and 126 and band portions of the first and second external electrodes 131 and 132 formed on the first and second side surfaces 5 and 6 of the ceramic body may be obtained, thereby further improving moisture resistance properties.

As set forth above, according to embodiments of the invention, a multilayer ceramic electronic component may include first and second internal electrodes arranged to be alternately offset from one another within a ceramic body in a width direction thereof, thereby reducing a difference in density between an active region and a margin portion in the width direction. Therefore, the multilayer ceramic electronic component may have a relatively small size with a high degree of capacitance implemented therein, while achieving improved reliability by preventing interlayer-delamination or cracks occurring in the margin portion due to interlayer-collapses during stacking and pressing processes, and preventing an insulation breakdown under conditions of high voltage.

While the present invention has been shown and described in connection with the embodiments, it will be apparent to those skilled in the art that modifications and variations can be made without departing from the spirit and scope of the invention as defined by the appended claims.

What is claimed is:

1. A multilayer ceramic electronic component, comprising:
　a ceramic body, having side surfaces, in which a plurality of dielectric layers are stacked;
　a plurality of first and second internal electrodes alternately exposed through both end surfaces of the ceramic body, having respective ones of the dielectric layers interposed therebetween, and being placed alternately to the left and to the right in a width direction of the ceramic body to be offset from one another, when the ceramic body is viewed in a width-thickness cross-sectional direction;
　first and second external electrodes formed on the end surfaces of the ceramic body and electrically connected to the first and second internal electrodes, respectively; and
　an insulating layer formed on at least one of the side surfaces of the ceramic body,
　wherein a width of an offset portion of the first and second internal electrodes is defined as a and the width a plus a margin portion on either side of the ceramic body in the width direction thereof is defined as b, $0.1 \leq a/b$ is satisfied, and the margin portion is a portion of the ceramic body in which the first and second internal electrodes are not formed in the width direction.

2. The multilayer ceramic electronic component of claim 1, wherein the first and second internal electrodes are spaced apart from the side surfaces of the ceramic body.

3. The multilayer ceramic electronic component of claim 1, wherein the first and second internal electrodes are spaced apart from the side surfaces of the ceramic body, and have respective space portions formed in non-overlapped corners of one ends thereof within the ceramic body, the space portions diagonally opposing one another.

4. The multilayer ceramic electronic component of claim 1, wherein the insulating layer includes an insulating polymer material.

5. The multilayer ceramic electronic component of claim 1, wherein the insulating layer has a composition different than that of the ceramic body.

6. The multilayer ceramic electronic component of claim 1, wherein a width of the insulating layer is defined as c, and $5\ \mu m \leq c \leq 50\ \mu m$ is satisfied.

7. A method of manufacturing a multilayer ceramic electronic component, the method comprising:
　preparing a multilayer body by stacking and pressing a plurality of ceramic green sheets having respective ones of first and second internal electrodes formed thereon such that the first and second internal electrodes are alternately stacked with one of the ceramic green sheets interposed therebetween and are arranged to be offset from one another to the left and to the right in a width direction;
　preparing a ceramic body, having side surfaces, by cutting the multilayer body into portions corresponding to respective chips while allowing the first and second internal electrodes to be alternately exposed through both end surfaces thereof; and
　forming first and second external electrodes on the end surfaces of the ceramic body so as to be electrically connected to the first and second internal electrodes, respectively; and
　forming an insulating layer on at least one of the side surfaces of the ceramic body,
　wherein the preparing of the multilayer body includes forming the first and second internal electrodes on the ceramic green sheets under conditions that a width of an offset portion of the first and second internal electrodes is defined as a and the width a plus a margin portion on either side of the ceramic body in the width direction thereof is defined as b, $0.1 \leq a/b$ is satisfied, and the margin portion is a portion of the ceramic body in which the first and second internal electrodes are not formed in the width direction.

8. The method of claim 7, wherein a width of the insulating layer is defined as c, and $5\ \mu m \leq c \leq 50\ \mu m$ is satisfied.

9. The method of claim 7, wherein the preparing of the multilayer body includes forming the first and second internal electrodes on the ceramic green sheets so as to be spaced apart from the side surfaces of the ceramic body.

10. The method of claim 7, wherein the preparing of the multilayer body includes forming the first and second internal electrodes on the ceramic green sheets so as to be spaced apart from the side surfaces of the ceramic body and have respective space portions formed in non-overlapped corners of one ends thereof within the ceramic body, the space portions diagonally opposing one another.

* * * * *